United States Patent
Siram et al.

(10) Patent No.: US 11,662,874 B2
(45) Date of Patent: May 30, 2023

(54) METHOD AND SYSTEM FOR TRANSFORMING WIREFRAMES TO AS-IS SCREENS WITH RESPONSIVE BEHAVIOUR

(71) Applicant: Tata Consultancy Services Limited, Mumbai (IN)

(72) Inventors: Subbarao Siram, Hyderabad (IN); Jyoti Joshi, Pune (IN); Bharat Jain, Indore (IN)

(73) Assignee: Tata Consultancy Serviced Limited, Mumbai (IN)

( * ) Notice: Subject to any disclaimer, the term of this patent is extended or adjusted under 35 U.S.C. 154(b) by 10 days.

(21) Appl. No.: 17/594,759

(22) PCT Filed: May 8, 2020

(86) PCT No.: PCT/IB2020/054384
§ 371 (c)(1),
(2) Date: Oct. 28, 2021

(87) PCT Pub. No.: WO2020/225791
PCT Pub. Date: Nov. 12, 2020

(65) Prior Publication Data
US 2022/0214773 A1    Jul. 7, 2022

(30) Foreign Application Priority Data
May 9, 2019    (IN) .............................. 201921018637

(51) Int. Cl.
*G06F 16/958*    (2019.01)
*G06F 3/0481*    (2022.01)
(Continued)

(52) U.S. Cl.
CPC .............. *G06F 3/0481* (2013.01); *G06F 8/34* (2013.01); *G06F 8/38* (2013.01); *G06F 16/958* (2019.01);
(Continued)

(58) Field of Classification Search
CPC . G06F 3/0481; G06F 8/34; G06F 8/38; G06F 16/958; G06T 7/10; G06T 2200/24; G06T 2207/20132
See application file for complete search history.

(56) References Cited

U.S. PATENT DOCUMENTS 7,675,528 B2    3/2010    Walker, Jr. et al.
7,907,774 B2    3/2011    Parr et al.
(Continued)

FOREIGN PATENT DOCUMENTS

CN    106055716 A    10/2016

OTHER PUBLICATIONS

Bordbar, Behzad et al., "Automated Generation of Metamodels for Web service Languages", Journal of Food Quality, Date: 2004, Publisher: Semantic Scholar, https://www.cs.kent.ac.uk/projects/krnf/mdaworkshop/submissions/Bordbar.pdf.
(Continued)

*Primary Examiner* — Keith D Bloomquist
(74) *Attorney, Agent, or Firm* — Finnegan, Henderson, Farabow, Garrett & Dunner, LLP

(57) ABSTRACT

Conventional methods for developing responsive application screens or UI screens, as per the desired wireframes is a time consuming and erroneous. The embodiments herein provide a method and system for automatically transforming wireframe screens to responsive application screens using a User Interface (UI) editor. The UI editor supported by a model editor enables user to select the controls that are present in the wireframe with its text, text properties, layout, color, background, borders and many more properties which are related to its visual appearance. Further, corresponding specification for the user selected requirements of the wireframe is generated automatically. The user can edit the specifications, for any changes required. Further, the UI
(Continued)

editor converts the specifications to a technological independent model, which can be imported into UI models and followed by code conversion to the required technology stack. User can modify the imported specifications before going to code conversion.

11 Claims, 8 Drawing Sheets

(51) Int. Cl.
  *G06T 7/10* (2017.01)
  *G06F 8/34* (2018.01)
  *G06F 8/38* (2018.01)
(52) U.S. Cl.
  CPC ............ *G06T 7/10* (2017.01); *G06T 2200/24* (2013.01); *G06T 2207/20132* (2013.01)

(56) References Cited

U.S. PATENT DOCUMENTS

| | | |
|---|---|---|
| 8,587,614 B2 | 11/2013 | Stevenson |
| 8,943,468 B2 | 1/2015 | Balasubramanian |
| 10,002,150 B1* | 6/2018 | Winn .................... G06Q 10/101 |
| 10,331,774 B2* | 6/2019 | Siram .................... G06F 40/143 |
| 11,102,257 B2 | 8/2021 | Edgington, Jr. |
| 2002/0116421 A1* | 8/2002 | Fox .......................... G06F 40/10 715/239 |
| 2003/0023641 A1* | 1/2003 | Gorman .................. G06F 40/10 715/255 |
| 2006/0248442 A1* | 11/2006 | Rosenstein ........... G06F 40/177 715/255 |
| 2010/0189342 A1 | 7/2010 | Parr et al. |
| 2011/0161847 A1* | 6/2011 | Chaikin ................ G06F 16/958 715/769 |
| 2013/0083070 A1* | 4/2013 | Ohki .................... G06F 16/9535 345/636 |
| 2017/0061003 A1* | 3/2017 | Baird .................. H04N 21/4825 |
| 2018/0091568 A1 | 3/2018 | Edgington, Jr. |
| 2018/0349367 A1 | 12/2018 | Soni |
| 2019/0332358 A1* | 10/2019 | Ganesh ...................... G06F 8/34 |
| 2021/0064693 A1* | 3/2021 | Sharma ................. G06F 16/986 |
| 2021/0117484 A1* | 4/2021 | Sollami .................. G06N 3/088 |

OTHER PUBLICATIONS

International Search Report and Written Opinion dated Sep. 3, 2020, in International Application No. PCT/IB2020/054384; 7 pages.

* cited by examiner

METHOD AND SYSTEM FOR TRANSFORMING WIREFRAMES TO AS-IS SCREENS WITH RESPONSIVE BEHAVIOUR

PRIORITY CLAIM

The present application is a U.S. National Stage Filing under 35 U.S.C. § 371 and claims priority from International Application No. PCT/IB2020/054384, filed on May 8, 2020, which application claims priority under 35 U.S.C. § 119 from Indian patent application no. 201921018637, filed on May 9, 2019. The entire contents of the aforementioned applications are incorporated herein by reference.

TECHNICAL FIELD

The disclosure herein generally relates to web designing and more particularly, to method and system for automatically transforming wireframes to as-is screens with responsive behavior.

BACKGROUND

In the digital world today, web applications on digital devices are a link between a consumer and the services provided through internet. Web page designing for these web applications is critical. Conventionally, developers engaged in design process work on wireframes, further on add the technical expertise from an expert to develop a webpage or as-is screen with responsive behavior. Any review changes suggested to the webpage require multiple iterations and repeated involvement of technical experts along with the developer to bring in the requested change. Further, a client reviewing the design is bound to add new requirements during every review. Thus, the design loop has to be repeated right from the wireframe stage multiple times, effectively consuming human effort and time.

Further, with rapid technology changes it is challenging to update the web designs with the endless new resolutions and devices. For many websites, creating a website version for each resolution and new device would impractical. Thus, design process needs to be efficient and easy to be up to date with the changing technology.

SUMMARY

Embodiments of the present disclosure present technological improvements as solutions to one or more of the above-mentioned technical problems recognized by the inventors in conventional systems.

For example, in one aspect, there is provided a processor implemented method for transforming a wireframe to as-is screen with responsive behavior. The method comprises accessing and displaying, through a User Interface (UI) editor implemented by the processor, an image of the wireframe. Further, the method comprises providing, by the UI editor implemented by the processor, an image cropping tool to a user. The image cropping tool allows the user to crop the image into a plurality parts; and select a control type for each part among a plurality of control types provided by the UI editor. Furthermore, the method comprises generating, by the UI editor implemented by the processor, part details corresponding to each part among the plurality of parts. The part details are generated in accordance with a template associated with the control type of each part, and wherein the part details for each part are uniquely identified by a control name, the control type and dimensions of part.

Furthermore, the method comprises extracting, by the UI editor implemented by the processor, content of each part based on the part details corresponding to each part using a plurality of image processing techniques. The extracted content comprises at least one of: a plurality of visual features of the part and a text present in the part. Further, the method comprises generating and displaying to the user, by the UI editor implemented by the processor, a part summary for the part details corresponding to each part. The part summary of each part details comprises the control name, the control type, the dimensions of each part and the content extracted from the part, wherein the part summary is editable to receive modifications from the user. Furthermore, the method comprises converting, by the UI editor implemented by the processor, the part summary of the plurality of parts to an eXtensible Markup Language (XML) based specification file in accordance with a set of XML support files accessible to UI editor. Further, thee method comprises generating, by a model editor implemented by the processor, a technology-independent model, in accordance with a predefined standard, from the XML based specification file generated by the UI editor. Furthermore, the method comprises generating, by the model editor implemented by the processor, the as-is screen with responsive web behavior for the image in accordance with the technology independent model generated from the XML based specification file and a user input indicating an implementation technology to be used from a plurality of implementation technologies available for generating the as-is responsive screen.

In another aspect, there is provided a system for transforming a wireframe to as-is screen with responsive behavior. The system comprises: a memory storing instructions; one or more Input/Output (I/O) interfaces; and processor coupled to the memory via the one or more I/O interfaces. The processor is configured by the instructions to access and display, through a User Interface (UI) editor implemented by the processor, an image of the wireframe. Further, the method comprises providing, by the UI editor implemented by the processor, an image cropping tool to a user. The image cropping tool allows the user to crop the image into a plurality parts; and select a control type for each part among a plurality of control types provided by the UI editor. Furthermore, the processor is configured to generate, via the UI editor implemented by the processor, part details corresponding to each part among the plurality of parts. The part details are generated in accordance with a template associated with the control type of each part, and wherein the part details for each part are uniquely identified by a control name, the control type and dimensions of part. Furthermore, the processor is configured to extract, via the UI editor implemented by the processor, content of each part based on the part details corresponding to each part using a plurality of image processing techniques. The extracted content comprises at least one of: a plurality of visual features of the part and a text present in the part. Further, the method comprises generating and displaying to the user, via the UI editor implemented by the processor, a part summary for the part details corresponding to each part. The part summary of each part details comprises the control name, the control type, the dimensions of each part and the content extracted from the part, wherein the part summary is editable to receive modifications from the user. Furthermore, the processor is configured to convert, via the UI editor implemented by the processor, the part summary of the plurality of parts to an eXtensible Markup Language (XML) based specification file in accordance with a set of XML support files accessible to UI editor. Further, the processor is configured to generate, via a model editor implemented by the processor, a technology-independent model, in accordance with a predefined standard, from the XML based specification file generated by the UI editor. Furthermore, the processor is configured to generate, via the model editor implemented by the processor, the as-is screen with responsive web behavior for the image in accordance with the technology independent model generated from the XML based specification file and a user input indicating an implementation technology to be used from a plurality of implementation technologies available for generating the as-is responsive screen.

In yet another aspect, there are provided one or more non-transitory machine readable information storage mediums comprising one or more instructions which when executed by one or more hardware processors causes a method for transforming a wireframe to as-is screen with responsive behavior. The method comprises accessing and displaying, through a User Interface (UI) editor implemented by the processor, an image of the wireframe. Further, the method comprises providing, by the UI editor implemented by the processor, an image cropping tool to a user. The image cropping tool allows the user to crop the image into a plurality parts; and select a control type for each part among a plurality of control types provided by the UI editor. Furthermore, the method comprises generating, by the UI editor implemented by the processor, part details corresponding to each part among the plurality of parts. The part details are generated in accordance with a template associated with the control type of each part, and wherein the part details for each part are uniquely identified by a control name, the control type and dimensions of part. Furthermore, the method comprises extracting, by the UI editor implemented by the processor, content of each part based on the part details corresponding to each part using a plurality of image processing techniques. The extracted content comprises at least one of: a plurality of visual features of the part and a text present in the part. Further, the method comprises generating and displaying to the user, by the UI editor implemented by the processor, a part summary for the part details corresponding to each part. The part summary of each part details comprises the control name, the control type, the dimensions of each part and the content extracted from the part, wherein the part summary is editable to receive modifications from the user. Furthermore, the method comprises converting, by the UI editor implemented by the processor, the part summary of the plurality of parts to an eXtensible Markup Language (XML) based specification file in accordance with a set of XML support files accessible to UI editor. Further, thee method comprises generating, by a model editor implemented by the processor, a technology-independent model, in accordance to a predefined standard, from the XML based specification file generated by the UI editor. Furthermore, the method comprises generating, by the model editor implemented by the processor, the as-is screen with responsive web behavior for the image in accordance with the technology independent model generated from the XML based specification file and a user input indicating an implementation technology to be used from a plurality of implementation technologies available for generating the as-is responsive screen.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a component of this disclosure, illustrate exemplary embodiments and, together with the description, serve to explain the disclosed principles.

DETAILED DESCRIPTION

Figure 1:
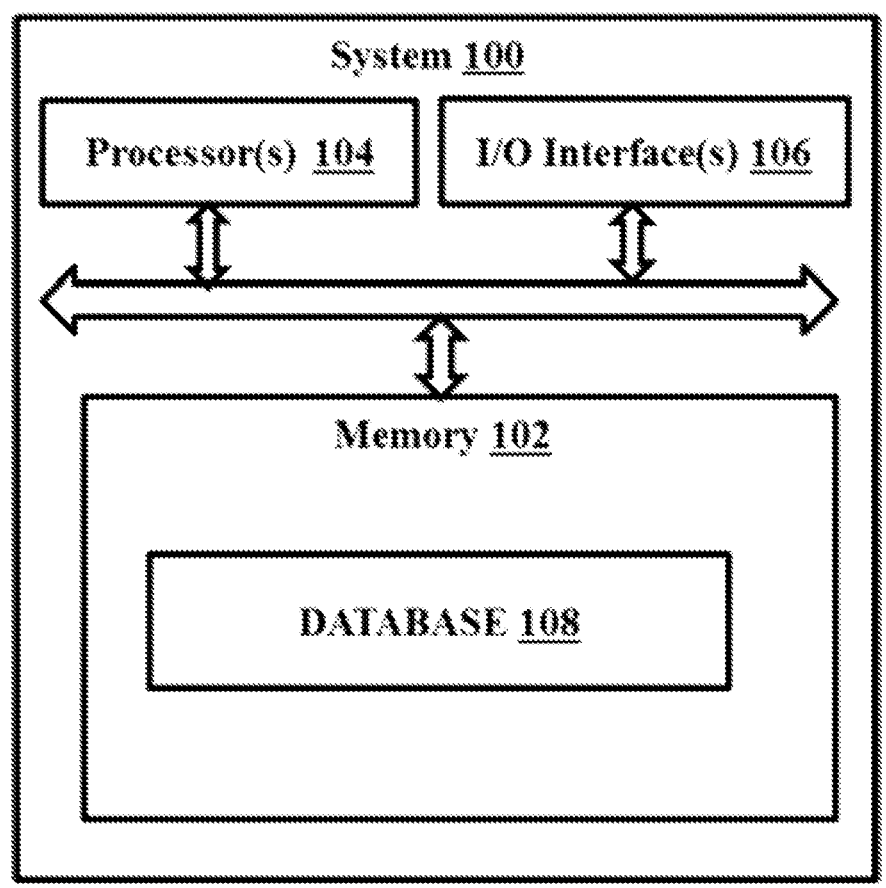
FIG. 1 illustrates an exemplary block diagram of a system for automatically transforming wireframes to a responsive application screens using a User Interface (UI) editor, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide a method and system for automatically transforming wireframes to as-is screens with responsive behavior using a User Interface (UI) editor supported by a model editor. An as-is screen with responsive behavior, herein refers to, is the final implemented interactive application screen. Developing the as-is screen having responsive behaviors, also referred as UI screens, as per the desired wireframes is a time consuming and erroneous. The disclosed UI editor enabling a user, typically a developer, to work and edit on an image of a wireframe, also referred wireframe screen. Further the UI editors processes the edited image to automatically extract specifications or user requirements from wireframes and converts the specifications to a technological independent model generated by the model editor. This technological independent model can then be imported into UI models and followed by code conversion to the required technology stack. User is also provided a control to modify the imported specifications before going to code conversion.

Thus, the system provides time efficient solution that may not require major involvement of technical experts while incorporating customer review inputs. Also, at same time provides a technological independent model of the wireframe that enables implementing the wireframe requirements of the user with new technology advancements on-the-fly, without need to rework from the wireframe stage.

Referring now to the drawings, and more particularly to FIGS. 1 through 3E, where similar reference characters denote corresponding features consistently throughout the figures, there are shown preferred embodiments and these embodiments are described in the context of the following exemplary system and/or method.

FIG. 1 illustrates an exemplary block diagram of a system 100 for automatically transforming a wireframe to as-is screens with responsive behavior using the UI editor supported by the model editor, in accordance with an embodiment of the present disclosure.

In an embodiment, the system 100 includes processor (s) 104, communication interface device(s), alternatively referred as or input/output (I/O) interface(s) 106, and one or more data storage devices or memory 102 operatively coupled to the processor (s) 104. The processor(s), alternatively referred as one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106, through the ports can be configured to receive an image file of the wireframe, if the image file is stored external to the system 100.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 102 can include the UI editor that can be implemented by the processor 104 to perform actions according to the embodiments of the present disclosure. The memory may include a database 108 that may store a plurality of images (image files or wireframe screens) of the wireframes, for which as-is screens with responsive behavior have to be designed. Furthermore, the memory 102 can store the user selected parts of the image, corresponding part details generated by the UI editor, corresponding parts summary generated by the UI editor.

In an embodiment, the data base 108 may be external (not shown) to the system 100 and accessed through the I/O interfaces 106. The memory 102 may further comprise information pertaining to input(s)/output(s) of each step performed by the processor 104 of the system 100 and methods of the present disclosure.

Figure 2A:
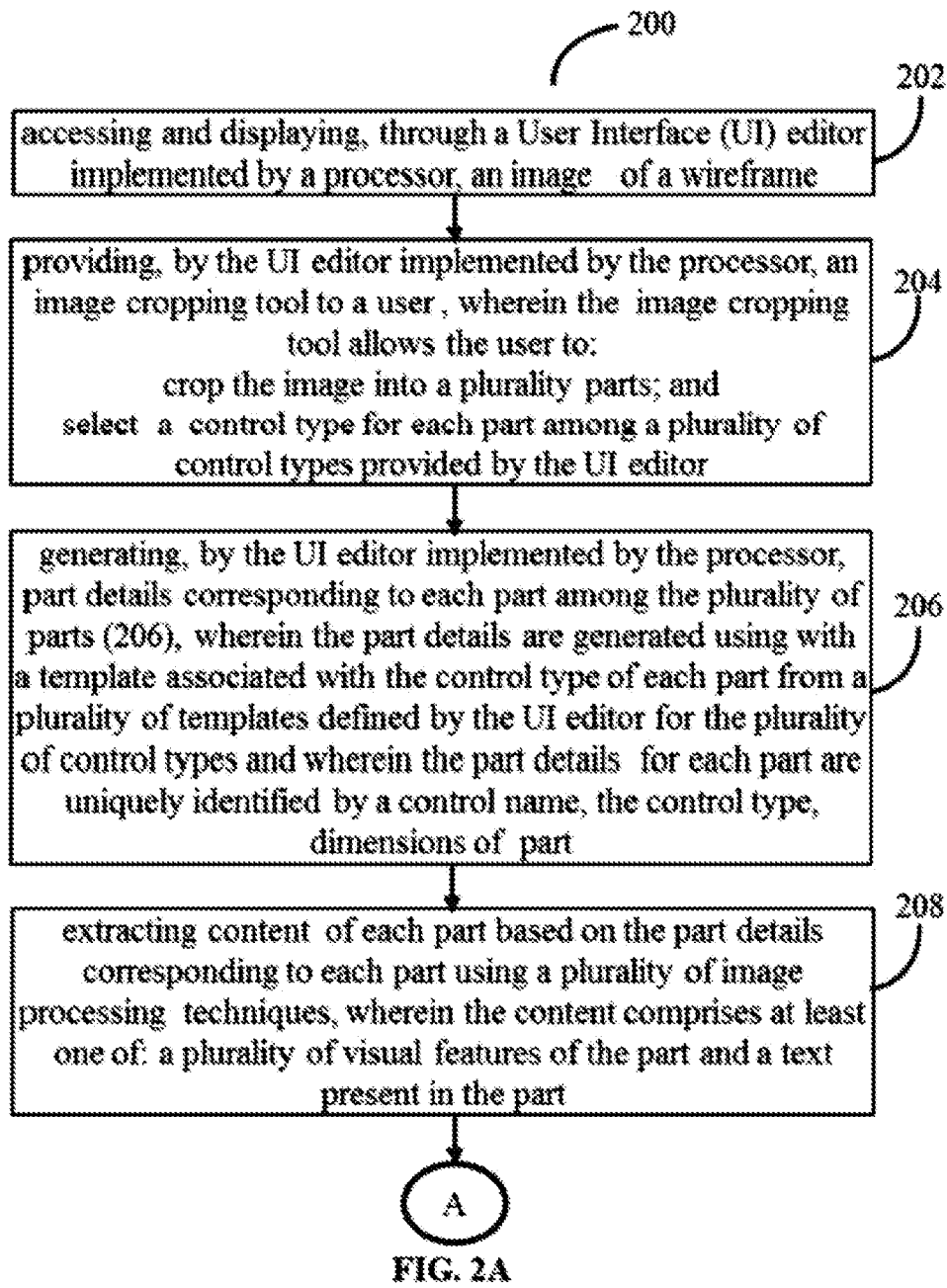
FIG. 2A and FIG. 2B illustrate an exemplary flow diagram of a method for automatically transforming the wireframes to the responsive application screens using the UI editor the system of FIG. 1, in accordance with an embodiment of the present disclosure.
Figure 2B:
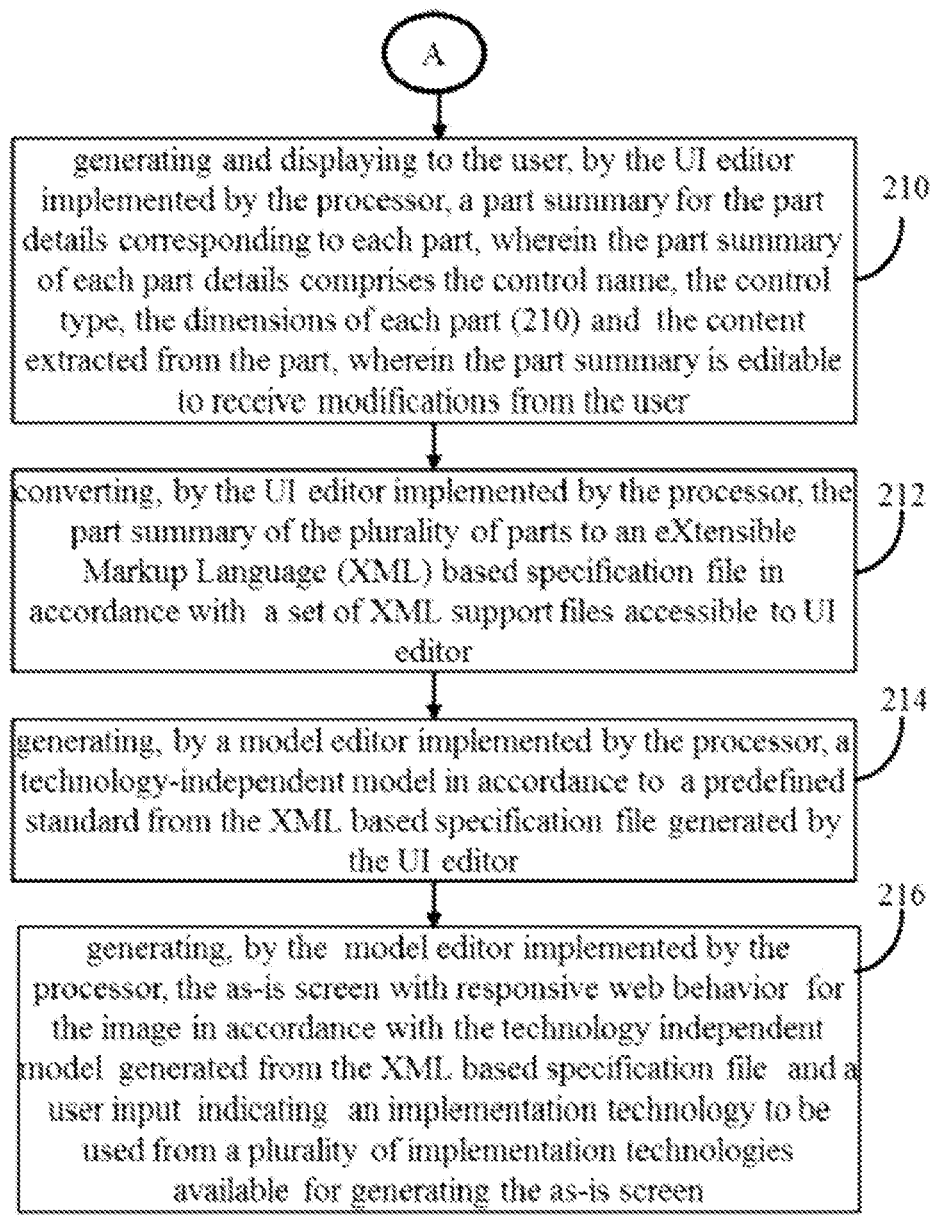

FIG. 2A and FIG. 2B illustrate an exemplary flow diagram of a method for automatically transforming wireframes to the as-is screens with responsive behavior using the User Interface (UI) editor supported by the model editor of the system of FIG. 1, in accordance with an embodiment of the present disclosure. In an embodiment, the system 100 comprises one or more data storage devices or the memory 102 operatively coupled to the one or more processors 104 and is configured to store instructions for execution of steps of the method 200 by the one or more processors 104. The steps of the method 200 of the present disclosure will now be explained with reference to the components or blocks of the system 100 as depicted in FIG. 1 and the steps of flow diagram as depicted in FIG. 2 in conjunction with use case illustrated in FIGS. 3A through 3E. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3A:
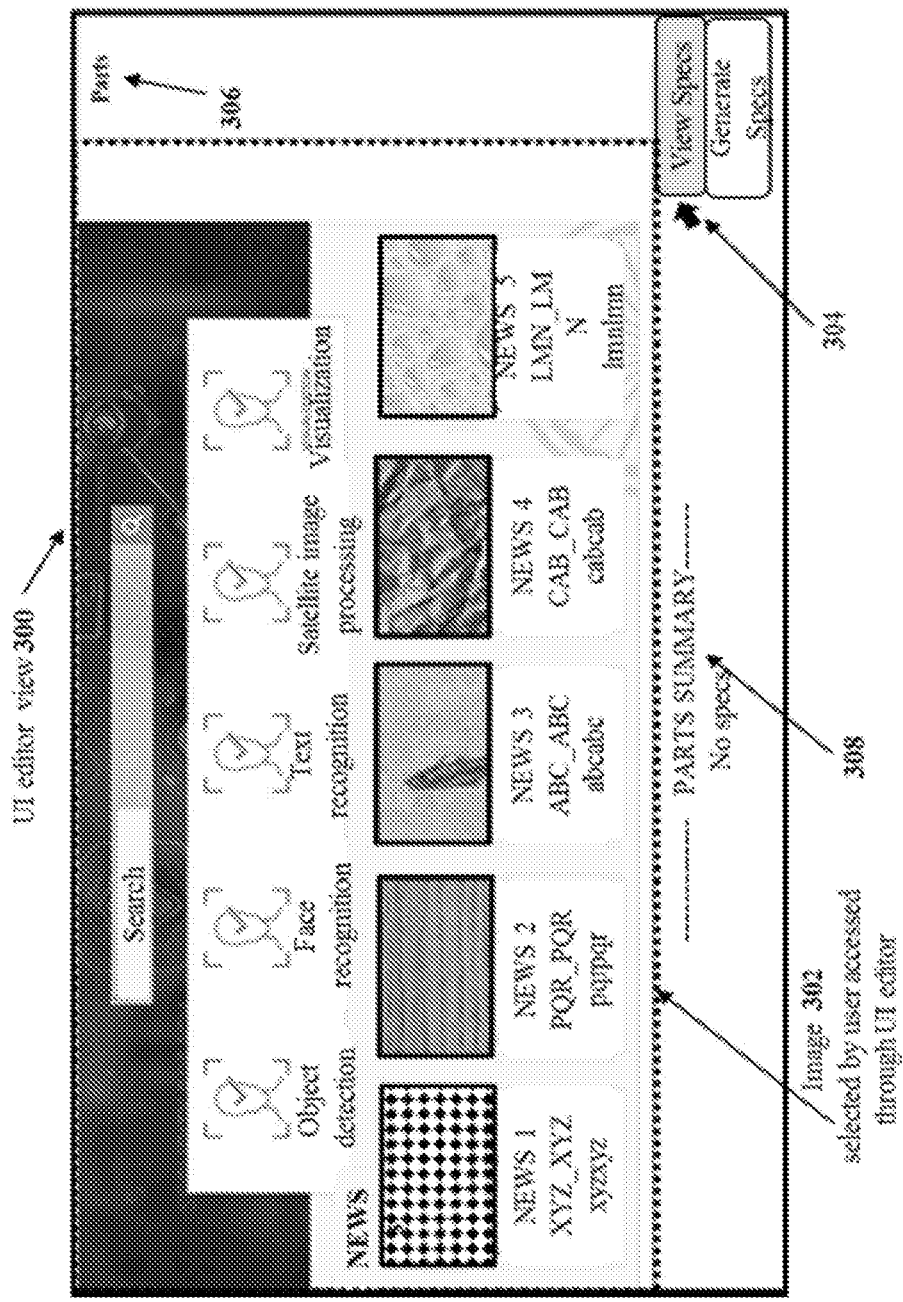
FIGS. 3A through 3E is a use case depicting plurality of stages in transforming a wireframe to as-is screens with responsive behavior using the UI editor of the system of FIG. 1, in accordance with an embodiment of the present disclosure

Referring to the steps of the method 200, in an embodiment of the present disclosure, at step 202, the UI editor implemented by the processor (s) 104 is configured to access and display an image of the wireframe. The FIG. 3A depicts a UI editor view 300 displaying an image 302 of a wireframe. The image 302 is accessed by the user through the UI editor. The image captures various details expected in a final screen such as the webpage. The image represents a digital wire frame. The details include the search tab, the images, the text and corresponding position on the application screen, sliders and the like. The UI editor view 300 also provides a column corresponding to parts 306 beside the displayed image 302, which list part details associated with one or more parts cropped from the image by the user. A part summary section 308 is provided below the image 302, which displays information derived from the part details, described in conjunction with FIGS. 3B through 3D.

In a current scenario as depicted in FIG. 3A, where user is yet to crop any segment of the image 302, the part details and part summary is not generated and corresponding section in FIG. 3A is displayed as empty sections when a 'view spec' tab 304 is clicked by the user.

Figure 3B:
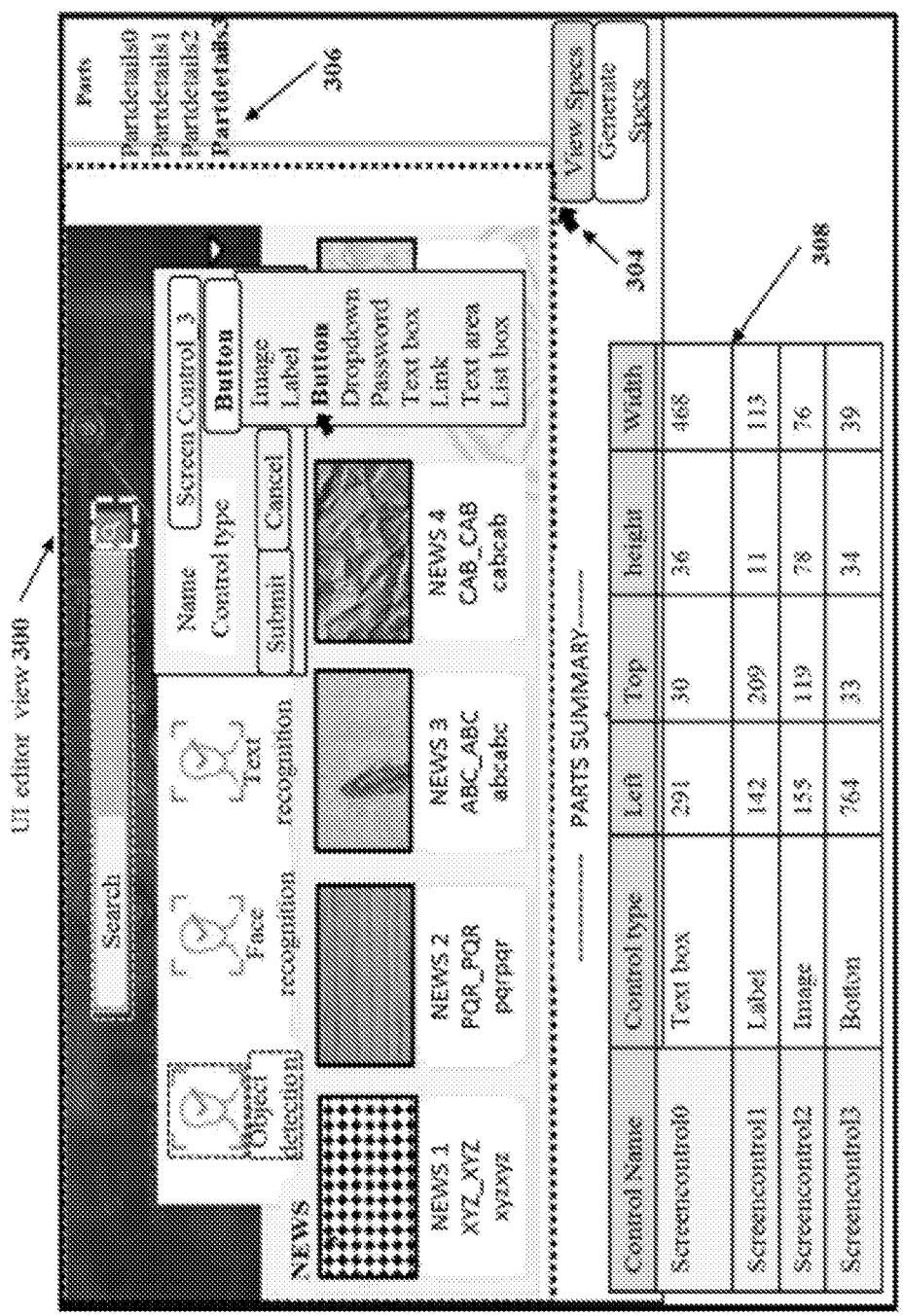
Figure 3C:
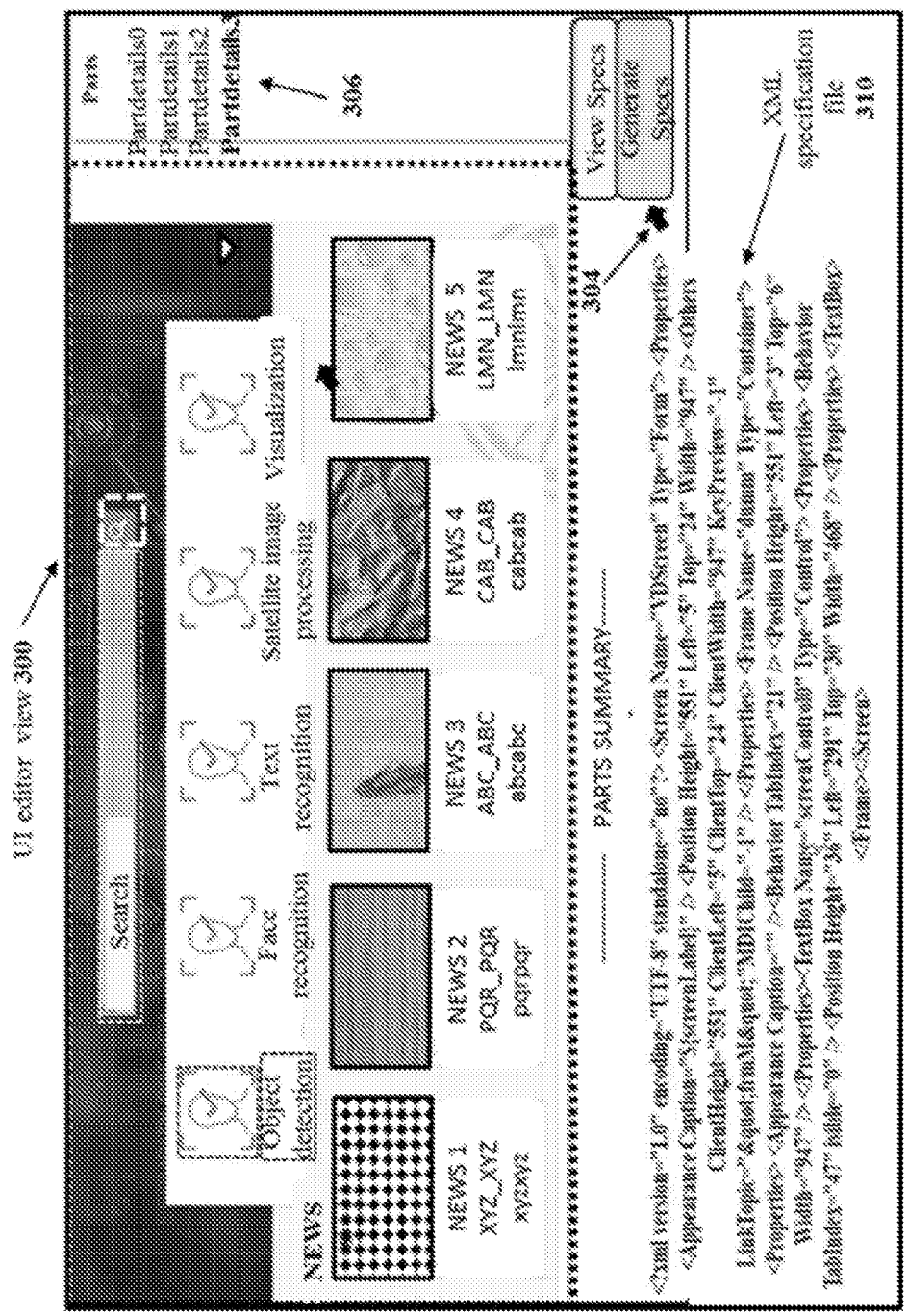
Figure 3D:
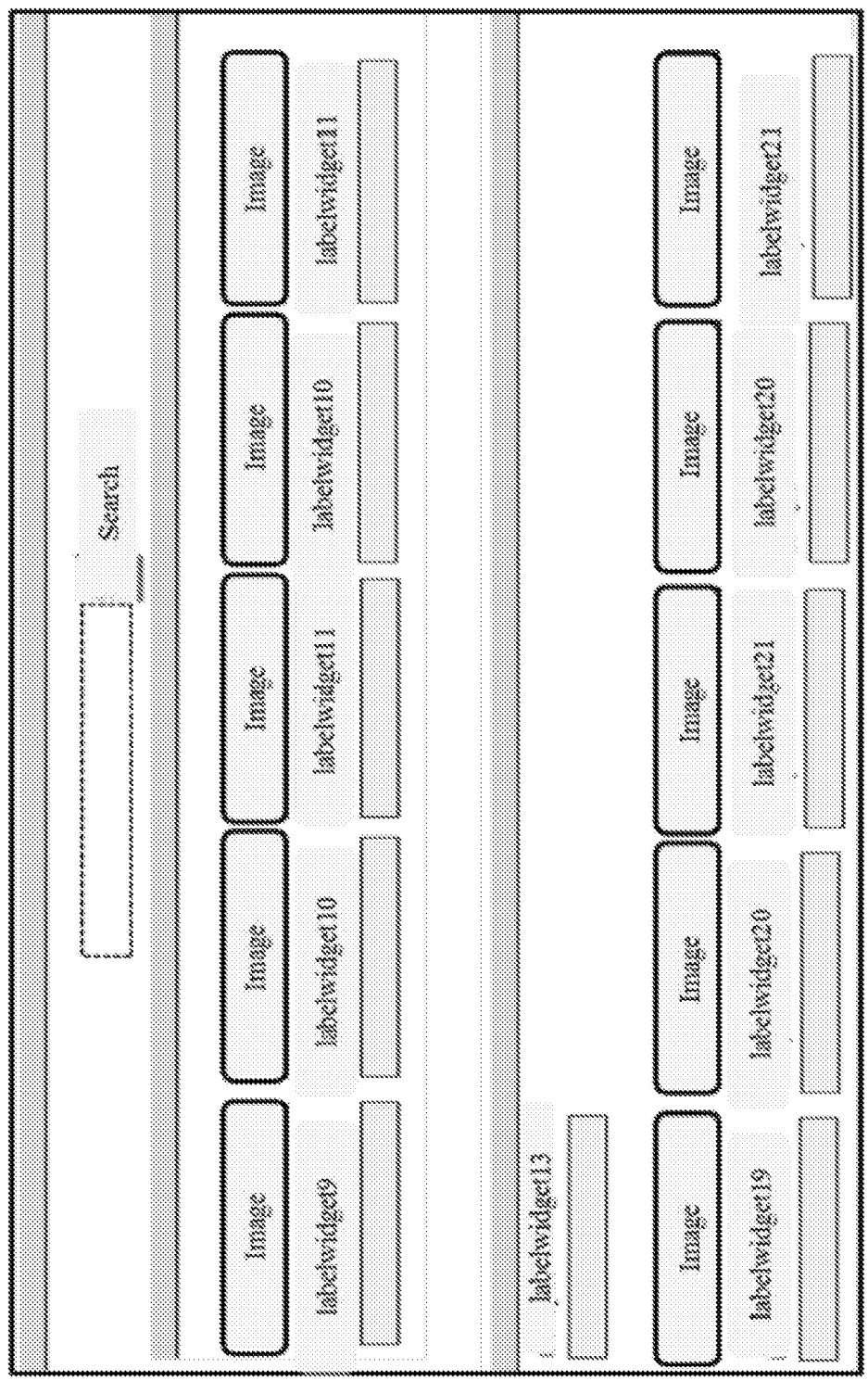

Referring now to the step 204 of the method 200, in an embodiment of the present disclosure, the UI editor implemented by the processor (s) 104 is configured to provide an image cropping tool to the user to crop the image into a plurality parts. As depicted in FIG. 3B, a plurality of cropped parts are marked with dotted boxes and each part among the plurality of parts can be uniquely identified by the user with a control name and a control type among a plurality of control types provided by the UI editor. For example, in FIG. 3B, the control name for the search symbol is screen control with control type indicating characteristics or function of the part, herein as 'button' for selection. The UI editor can provide a plurality of control types including but not limited to an image, a label, a button, a dropdown, a password, a text box, a link, a text area and a list box. The user is free to select as per his/her requirement.

Referring now to the step 206 of the method 200, in an embodiment of the present disclosure, the UI implemented by the processor (s) 104 is configured to automatically generate part details corresponding to each part among the plurality of parts cropped by the user. The part details 306, as depicted in FIG. 3B, are generated using a template associated with the control type of each part. Thus, each control type has a corresponding template defined by the UI editor. Further, the template associated with the control type is selected by the UI editor from a plurality of templates, defined by the UI editor for the control type, in accordance with the plurality of implementation technologies available for generating the as-is screen. The templates may be stored in the database 108. The templates provide the XML content for each control and this template is filled with the processed user provided details. An example for the template is provided below:

Assume a model of 'text box' (control type) with 'part details' as:

```
name:custId location:10,23,50,90
Template :<textbox name=$name$ left=$left$ top=$top$ *******>
Actual : <textbox name=custId left=10 top=23 *******>
```

The part details for each part are uniquely identified by a control name, the control type, dimensions of part. Referring now to the step 208 of the method 200, in an embodiment of the present disclosure, the UI implemented by the processor (s) 104 is configured to extract content of each part based on the part details corresponding to each part using a plurality of image processing techniques. The extracted content comprises at least one of: a plurality of visual features of the part and a text present in the part. For example, if the part has control type as 'label' that includes text content then the text is also extracted along with the visual features if any. Image processing is used for all the control type to get visual features of the part. For example, the visual features include border type (such as sharp corners, rounded corners), color details, font size and the like. Image processing techniques used include but are not limited to image cropping, visual feature extraction, text extraction and the like.

Referring now to the step 210 of the method 200, in an embodiment of the present disclosure, the UI implemented by the processor (s) 104 is configured to automatically generate and display parts summary for the part details corresponding to each part. The automatic generation is triggered when user clicks on 'generate spec' tab 304. The part summary 308 of each part details comprises the control name, the control type, the dimension (positon and size) of each part as depicted in FIG. 3B. In an embodiment the extracted content such the visual features may also be displayed to the user. In the example depicted in FIG. 3B, 'screencontrol3' is a part name with control type as 'button' and the corresponding dimensions providing the length, width and position coordinates (left and top), of the part within the image 302.

The part summary is editable by the user for any modification he/she intends to make to his/her requirement. Thus, user can add or delete the parts.

Referring now to the step 212 of the method 200, in an embodiment of the present disclosure, the UI implemented by the processor (s) 104 is configured convert the part summary of the plurality of parts to an XML based specification file 310, in accordance with the content and the part summary of each part (212) along with a set of XML support files accessible to UI editor. The set of XML support files may be stored in the database 108. The set of XML support files enable linking of files that store the parts cropped by the user to the XML-based specification file. An example XML-based specification file for a cropped image with control type as image' is as below:

<image src="part1.jpg" ****> here it refers part1.jpg

Figure 3E:
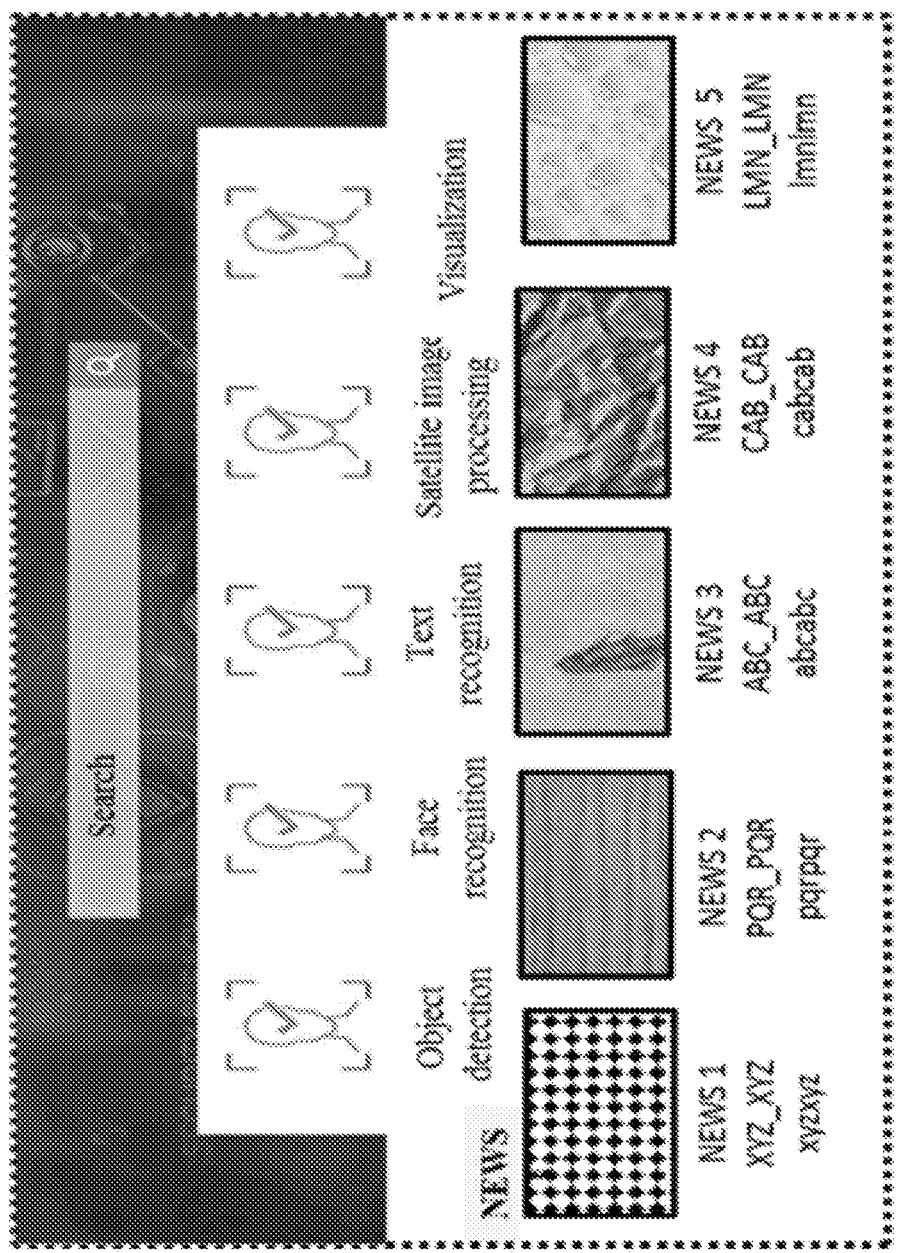

Referring now to the step 214 of the method 200, in an embodiment of the present disclosure, the model editor implemented by the processor (s) 104 is configured to generate a technology-independent model, in accordance to a predefined standard, from the XML based specification file. For example, the standard referred can be the Open Mobile Alliance (OMA) standard or the like. The technology independent model is a relational model as per Object Modelling Group standards, created for the XML-based specification file and captures functional requirements of the wireframe from the XML-based specification file. Further, the technology independent model is independent of the implementation technology to be used for generating the as-is screen with responsive behavior. An example technology independent model generated for the image 302 is depicted in FIG. 3E, wherein the model represents a plurality of model blocks with corresponding functionality, such as, images for parts labelled as image and label widgets for part labelled as 'labels'.

Referring now to the step 216 of the method 200, in an embodiment of the present disclosure, the model editor implemented by the processor (s) 104 is configured to generate the as-is screen with responsive web behavior for the image 302 in accordance with the technology independent model generated from the XML based specification file and a user input indicating an implementation technology to be used from a plurality of implementation technologies available for generating the as-is responsive screen.

Thus, the technology independent model can be created from XML specifications into UI models and followed by code conversion to the required technology stack. User is also provided a control to modify the imported specifications before going to code conversion along with choice of technology during the generation The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A processor implemented method for transforming a wireframe to as-is screen with responsive behavior, the method comprising:
   accessing and displaying, through a User Interface (UI) editor implemented by the processor, an image of the wireframe;
   providing, by the UI editor implemented by the processor, an image cropping tool to a user (204), wherein the image cropping tool allows the user to:
      crop the image into a plurality parts; and
      select a control type for each part among a plurality of control types provided by the UI editor;
   generating, by the UI editor implemented by the processor, part details corresponding to each part among the plurality of parts, wherein the part details are generated in accordance with a template associated with the control type of each part, and wherein the part details for each part are uniquely identified by a control name, the control type and dimensions of part;
   extracting, by the UI editor implemented by the processor, content of each part based on the part details corresponding to each part using a plurality of image processing techniques, wherein the content comprises at least one of: a plurality of visual features of the part and a text present in the part;
   generating and displaying to the user, by the UI editor implemented by the processor, a part summary for the part details corresponding to each part, wherein the part summary of each part details comprises the control name, the control type, the dimensions of each part and the content extracted from the part, wherein the part summary is editable to receive modifications from the user;
   converting, by the UI editor implemented by the processor, the part summary of the plurality of parts to an eXtensible Markup Language (XML) based specification file in accordance with a set of XML support files accessible to UI editor;
   generating, by a model editor implemented by the processor, a technology-independent model, in accordance to a predefined standard, from the XML based specification file generated by the UI editor; and
   generating, by the model editor implemented by the processor, the as-is screen with responsive web behavior for the image in accordance with the technology independent model generated from the XML based specification file and a user input indicating an implementation technology to be used from a plurality of implementation technologies available for generating the as-is responsive screen.

2. The method of claim 1, wherein the template associated with the control type is selected by the UI editor from a plurality of templates, defined by the UI editor for the control type, in accordance with the plurality of implementation technologies.

3. The method of claim 1, wherein the technology independent model is created from the XML-based specification file to capture functional requirements of the wireframe from the XML-based specification file and is independent of the implementation technology to be used for generating the as-is screen with responsive behavior.

4. The method of claim 1, wherein the set of XML support files enable linking of files that store the parts cropped by the user to the XML-based specification file.

5. The method of claim 1, wherein the plurality of image processing techniques comprise image cropping, visual feature extraction and text extraction.

6. A system for transforming a wireframe to as-is screen with responsive behavior, the system comprising:
   a memory storing instructions;
   one or more Input/Output (I/O) interfaces;
   and a processor coupled to the memory via the one or more I/O interfaces, wherein the processor is configured by the instructions to:
      access and display, via the UI editor implemented by the processor, an image of the wireframe;
      provide, via the UI editor implemented by the processor, an image cropping tool to a user, wherein the image cropping tool allows the user to:
         crop the image into a plurality parts; and
         select a control type for each part among a plurality of control types provided by the UI editor;
      generate, via the UI editor implemented by the processor, part details corresponding to each part among the plurality of parts, wherein the part details are generated in accordance with a template associated with the control type of each part, and wherein the part details for each part are uniquely identified by a control name, the control type and dimensions of part;

extract, via the UI editor implemented by the processor, content of each part based on the part details corresponding to each part using a plurality of image processing techniques, wherein the content comprises at least one of: a plurality of visual features of the part and a text present in the part;

generate and display, via the UI editor implemented by the processor, to the user a part summary for the part details corresponding to each part, wherein the part summary of each part details comprises the control name, the control type, the dimensions of each part and the content extracted from the part, wherein the part summary is editable to receive modifications from the user;

convert, via the UI editor implemented by the processor, the part summary of the plurality of parts to an eXtensible Markup Language (XML) based specification file in accordance with a set of XML support files accessible to UI editor;

generate, via a model editor implemented by the processor, a technology-independent model, in accordance to a predefined standard, from the XML based specification file generated by the UI editor; and generate, via the model editor implemented by the processor, the as-is screen with responsive web behavior for the image in accordance with the technology independent model generated from the XML based specification file and a user input indicating an implementation technology to be used from a plurality of implementation technologies available for generating the as-is responsive screen.

7. The system of claim 6, wherein the template associated with the control type is selected by the UI editor from a plurality of templates, defined by the UI editor for the control type, in accordance with the plurality of implementation technologies.

8. The system of claim 6, wherein the technology independent model is created from the XML-based specification file to capture functional requirements of the wireframe from the XML-based specification file and is independent of the implementation technology to be used for generating the as-is screen with responsive behavior.

9. The system of claim 6, wherein the set of XML support files enable linking of files that store the parts cropped by the user to the XML-based specification file.

10. The system of claim 6, wherein the plurality of image processing techniques comprise image cropping, visual feature extraction and text extraction.

11. One or more non-transitory machine readable information storage mediums comprising one or more instructions, which when executed by one or more hardware processors causes a method for:

accessing and displaying, through a User Interface (UI) editor implemented by the processor, an image of the wireframe;

providing, by the UI editor implemented by the processor, an image cropping tool to a user, wherein the image cropping tool allows the user to:
crop the image into a plurality parts; and
select a control type for each part among a plurality of control types provided by the UI editor;

generating, by the UI editor implemented by the processor, part details corresponding to each part among the plurality of parts, wherein the part details are generated in accordance with a template associated with the control type of each part, and wherein the part details for each part are uniquely identified by a control name, the control type and dimensions of part;

extracting, by the UI editor implemented by the processor, content of each part based on the part details corresponding to each part using a plurality of image processing techniques, wherein the content comprises at least one of: a plurality of visual features of the part and a text present in the part;

generating and displaying to the user, by the UI editor implemented by the processor, a part summary for the part details corresponding to each part, wherein the part summary of each part details comprises the control name, the control type, the dimensions of each part and the content extracted from the part, wherein the part summary is editable to receive modifications from the user;

converting, by the UI editor implemented by the processor, the part summary of the plurality of parts to an eXtensible Markup Language (XML) based specification file in accordance with a set of XML support files accessible to UI editor;

generating, by a model editor implemented by the processor, a technology-independent model, in accordance to a predefined standard, from the XML based specification file generated by the UI editor; and generating, by the model editor implemented by the processor, the as-is screen with responsive web behavior for the image in accordance with the technology independent model generated from the XML based specification file and a user input indicating an implementation technology to be used from a plurality of implementation technologies available for generating the as-is responsive screen.

* * * * *